United States Patent

McCool et al.

[11] Patent Number: 5,987,397
[45] Date of Patent: Nov. 16, 1999

[54] NEURAL NETWORK SYSTEM FOR ESTIMATION OF HELICOPTER GROSS WEIGHT AND CENTER OF GRAVITY LOCATION

[75] Inventors: Kelly McCool, University Park; David Haas, North Potomac, both of Md.

[73] Assignee: The United States of America as represented by the Secretary of the Navy, Washington, D.C.

[21] Appl. No.: 09/042,045

[22] Filed: Mar. 13, 1998

[51] Int. Cl.$^6$ .................................................. G01C 21/10
[52] U.S. Cl. ...................... 702/173; 702/144; 364/158; 73/178 H; 706/25
[58] Field of Search ..................................... 702/173, 169, 702/144; 364/158; 73/65.06, 65.05, 178 H; 706/25

[56] References Cited

U.S. PATENT DOCUMENTS

| | | |
|---|---|---|
| 4,023,409 | 5/1977 | Durand . |
| 4,300,200 | 11/1981 | Doe . |
| 4,470,116 | 9/1984 | Ratchford .................................. 701/35 |
| 4,574,360 | 3/1986 | Bateman .................................. 702/173 |
| 4,702,106 | 10/1987 | Hassenpflug et al. . |
| 4,780,838 | 10/1988 | Adelson .................................. 702/174 |
| 4,794,793 | 1/1989 | Farre et al. . |
| 4,829,441 | 5/1989 | Mandle et al. . |
| 4,893,261 | 1/1990 | Flint, III et al. . |
| 5,063,777 | 11/1991 | Arethens et al. . |
| 5,121,325 | 6/1992 | DeJonge . |
| 5,214,596 | 5/1993 | Muller . |
| 5,225,829 | 7/1993 | Bateman . |
| 5,229,956 | 7/1993 | Daniell et al. .......................... 702/173 |
| 5,457,634 | 10/1995 | Chakravarty . |
| 5,571,953 | 11/1996 | Wu ........................................ 73/65.06 |
| 5,751,609 | 5/1998 | Schaefer et al. ........................ 364/158 |

OTHER PUBLICATIONS

McCool, Kelly M., David J. Haas and Carl G. Schaefer, Jr., "A Neural Network Based Approach to Helicopter Low Airspeed and Sideslip Angle Estimation," Proceedings of American Institute of Aeronautics and Astronautics Flight Simulation Technologies Conference, Paper No. 96–3481 (Jul. 29–31, 1996) pp. 91–101.

*Primary Examiner*—Marc S. Hoff
*Assistant Examiner*—Hien Vo
*Attorney, Agent, or Firm*—John Forrest; Jacob Shuster

[57] ABSTRACT

The invention is directed to a helicopter health and usage monitoring system utilizing a neural network for estimating gross weight and center of gravity location from measured flight condition parameter inputs; and includes means for measuring a plurality of variable flight condition parameters during flight of the helicopter; memory means for successively receiving and storing parameter input signals as well as estimates of gross weight and center of gravity location; and processing means responsive to the signals received from the measurement means for generating the gross weight and center of gravity location estimates.

12 Claims, 2 Drawing Sheets

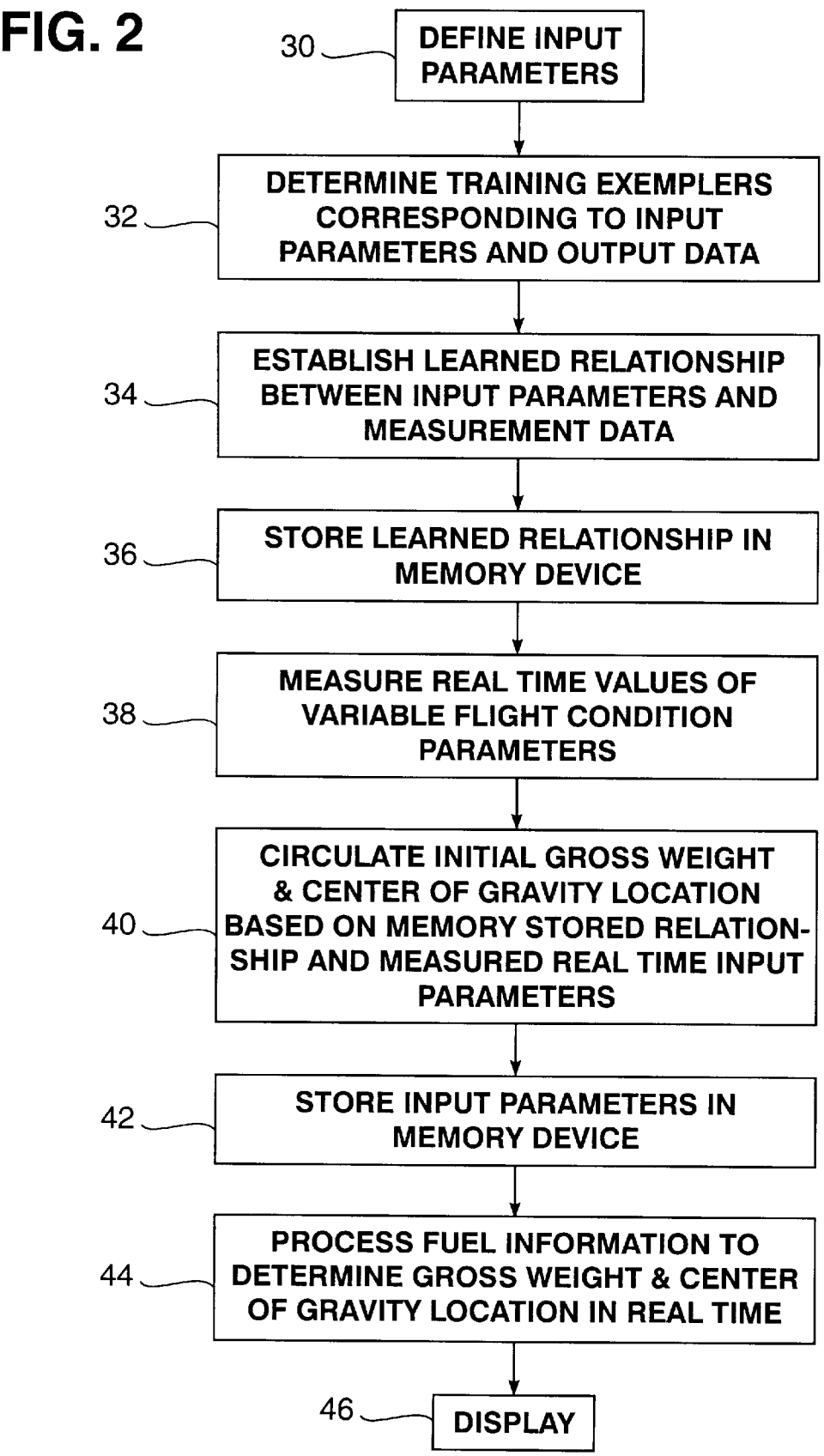

ously recorded test data is used as a set of network
NEURAL NETWORK SYSTEM FOR ESTIMATION OF HELICOPTER GROSS WEIGHT AND CENTER OF GRAVITY LOCATION The present invention relates generally to an on-board helicopter system for estimating variable flight data, and is related to prior application Ser. Nos. 08/736,176, now U.S. Pat. No. 5,901,272 and 08/740,067, now U.S. Pat. No. 5,751,609, filed Oct. 24, 1996 and Ser. No. 08/955,970, filed Oct. 22, 1997, now U.S. Pat. No. 5,890,101, the disclosures of which are incorporated herein by reference and with respect to which the present application is a continuation-in-part.

BACKGROUND OF THE INVENTION

Current health and usage monitoring systems for helicopters require aircraft gross weight and center of gravity location data to accurately calculate estimates on fatigue damage accumulation. Such data is initially entered manually into the monitoring system by the helicopter pilot and/or maintainer. It is therefore an important object of the present invention to eliminate the need for such manual entry of gross weight and center of gravity location data in helicopter health and usage monitoring systems to improve its efficiency as well as to reduce human error.

The gross weight and center of gravity location may also form some of the parameter input data associated with the neural network systems disclosed in the aforementioned related copending applications, so as to streamline the low airspeed prediction process associated therewith as an additional object of the present invention.

SUMMARY OF THE INVENTION

In accordance with the present invention, information on gross weight and center of gravity location in a helicopter is estimated in a real time fashion by a neural network system which includes means for defining input signals derived from a plurality of variable parameters that are recorded during flight of the helicopter based on measurements in a non-rotating reference frame associated with the helicopter. Previously recorded test flight data in terms of variable input parameters and coinciding reference data on gross weight and center of gravity location are used to establish a learned relationship between such input parameters and the coinciding reference data. Memory means is provided for storing the learned relationship as a nonlinear algorithm on board the helicopter for use in a signal processor, receiving real time values of the input parameters and in accordance with said algorithm determine and display estimates of the gross weight and center of gravity locations under flight conditions.

BRIEF DESCRIPTION OF DRAWING FIGURES

A more complete appreciation of the invention and many of its attendant advantages will be readily appreciated as the same becomes better understood by reference to the following detailed description when considered in connection with the accompanying drawing wherein:

FIG. 2 is a flow chart diagramming a method for practicing the present invention;

DETAILED DESCRIPTION OF PREFERRED EMBODIMENTS

Figure 1:
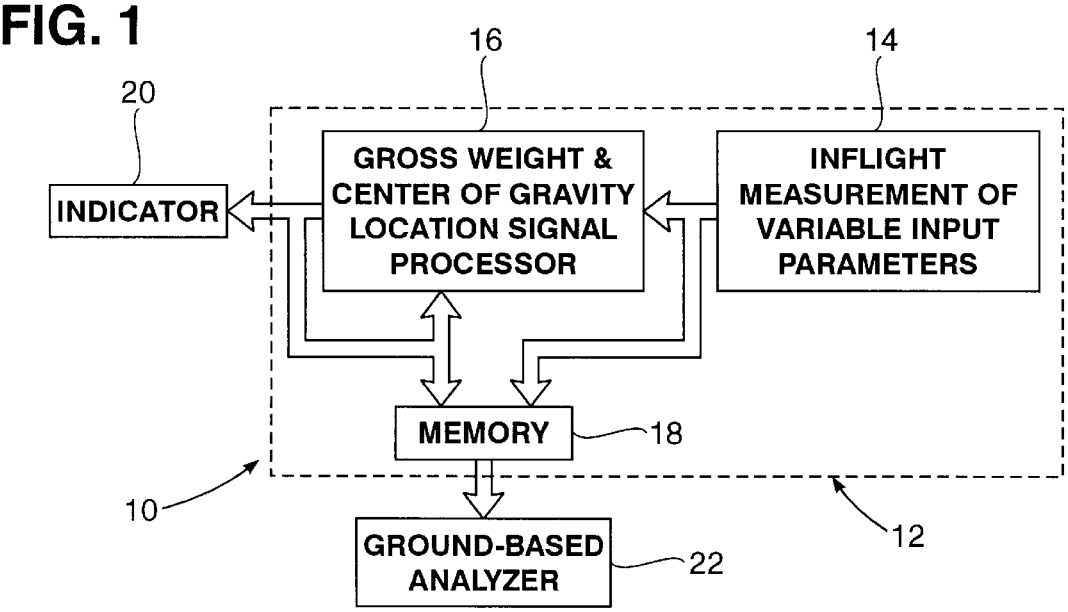
FIG. 1 is a diagram symbolically representing one embodiment of the present invention installed on a helicopter.

Referring now to the drawing in detail, FIG. 1 diagrams a health and usage monitoring system 10 onboard a helicopter embodying a neural network having a source code in accordance with the present invention. The system 10 embodies gross weight and center of gravity location determining means 12, which includes means 14 for performing input measurements and signal processor means 16 for generating successive input parameter signals representing such measurements. The input parameter signals are successively received by a memory device 18 coupled to the signal processor 16 to enable its generation of output signals reflecting gross weight of the helicopter and location of its center of gravity, displayed by indicator 20, as variable outputs based on the input parameters and at least one algorithm equation.

With continued reference to FIG. 1, the input parameter signals in terms of real time values are fed from the inflight measurement means 14 to memory 18 for storage. The signal processor 16 also receives parameter inputs from the measurement means 14 and processes the inputs thereto in accordance with a stored nonlinear mathematical algorithm received from the memory 18 of the input parameter determining means 12. The measurement and signal processed data stored in memory 18 may be extracted through a ground based analyzer 22, as also diagrammed in FIG. 1, for engineering analysis purposes.

Figure 3:
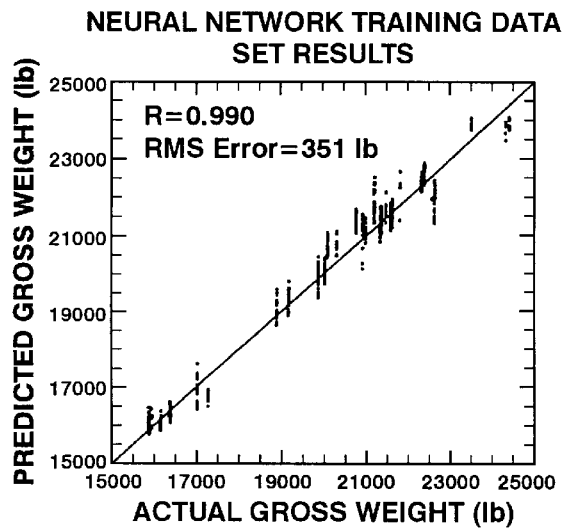
FIG. 3 is a graphical representation of a typical data set for training of the neural network in accordance with the present invention.
Figure 4:
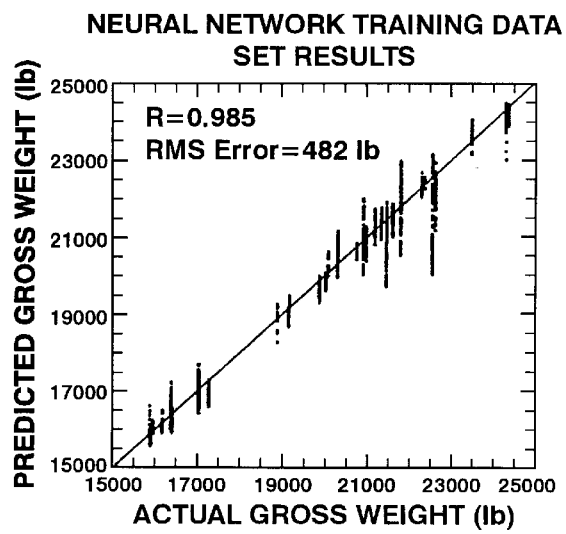
FIG. 4 is a graphical representation of a typical data set for testing the neural network.

The variable parameter inputs from measuring means 14 are based on a plurality of measurements potentially including but not limited to: (1) collective stick position; (2) lateral cyclic stick position; (3) longitudinal cyclic stick position; (4) pedal position; (5) pitch attitude; (6) roll attitude; (7) pitch rate; (8) roll rate; (9) yaw rate; (10) engine torque; (11) rotor speed; (12) altitude; (13) load factor; (14) rate of climb; (15) fuel flow; and (16) fuel weight. Other of such input data measurements may also be required. The algorithm stored in the memory 18 is a fixed equation relating input parameters to gross weight and center of gravity location. This fixed equation is developed prior to installation onto the aircraft using previously recorded flight test data which includes flight conditions at a full range of variations in gross weight and center of gravity location. A representative portion of the previously recorded test data is used as a set of network training data, as graphically depicted for example in FIG. 3 with respect to gross weight estimated. Based on such training data, a sufficient level of correlation is achieved between predicted and measured gross weight to establish a mathematical algorithm relationship between the variable parameter inputs and aircraft gross weight. Such relationship is evaluated from a set of test data such as predicted flight data under hover flight conditions at a variety of gross weights at data points distinct from the data points for the aforementioned set of training data in order to assess how well the network system generalizes. FIG. 4 for example graphically depicts test data on predicted gross weight from which the neural network algorithm was evaluated. Thus, in accordance with the present invention, the system 10 is operated during a first hover maneuver of a given helicopter flight when engine checks are routinely performed. The system 10 thus identifies through indicator 20 gross weight and center of gravity location during initial takeoff under hover conditions. For the remainder of flight, such initial gross weight and center of gravity location predictions are used in conjunction with recorded fuel flow or fuel weight data to update the gross weight and center of gravity location display by indicator 20 based on changes in gross weight and center of gravity location due to fuel burn. Gross weight and center of gravity location predictions may also be updated during specified forward flight conditions for verification of initial and real time estimates.

FIG. 2 diagrams the method associated with the neural network of system 10 diagrammed in FIG. 1 for practice of the present invention. Boxes 30–34 reflect the training phase for initially developing a nonlinear input-output relationship between input variables and the desired output. First, at 30, the user defines input parameters which are measured in the helicopter fixed reference frame. Next at 32, training exemplars corresponding to gross weight and location of center of gravity used to train the network are determined. The training exemplars, which include the input parameters and a corresponding desired output are either directly measured during test flights or are determined based on parameters measured during test flights. The data used to determine the training exemplars is measured under a plurality of flight conditions. Then, at 34, the neural network learns an input-output relationship between the input parameters and the corresponding desired output such as gross weight and center of gravity location, represented by at least one nonlinear equation. At 36, the nonlinear equation is stored in the memory device 18 onboard the helicopter, at which point only the variable parameters need be measured to estimate gross weight and center of gravity location. At 38, onboard sensors of measurement means 14 measure the variable parameters in the helicopter fixed reference frame. At 40, the gross weight and center of gravity location are calculated within the signal processor 16, based on the measured variable parameters at 38. The input parameters are optionally stored, at 42, in memory device 18 onboard the helicopter. At 44, the fuel information is processed in conjunction with the initial calculation at 40 to determine the desired real-time gross weight and center of gravity location output. Finally, at 46, the desired output is displayed by indicator 20 for use by occupants of the helicopter and/or is recorded by the aircraft monitoring system.

By continuously measuring the variable parameters at a predetermined sampling rate and then signal processing the input parameters, the desired output is estimated and displayed in a real time fashion. Training the neural network results in one or more neural network equations being learned for performance of the parameter signal calculations. Such network equations are then converted into computer language and are installed onboard the helicopter.

The foregoing described neural network type of system heretofore used for low airspeed estimation, when used for estimation of gross weight and center of gravity location in accordance with the present invention avoids human errors associated with current helicopter health and usage monitoring systems, as well as to reduce the workload for the helicopter pilot or maintainer.

Obviously, modifications and variations of the present invention may be possible in light of the foregoing teachings. It is therefore to be understood that within the scope of the appended claims the invention may be practiced otherwise than as specifically described.

What is claimed is:

1. A system for estimating information on gross weight and center of gravity location onboard a helicopter by using variable input parameters measured during airflight in a reference frame fixed relative to the helicopter, including: means for generating successive signals representing said variable input parameters measured; and means for determining from said signals the estimated information in terms of real time values of the gross weight and center of gravity location in accordance with a learned relationship.

2. The system as defined in claim 1 wherein said learned relationship is developed by use of at least one neural network algorithm which interrelates said input parameters with coinciding reference data obtained from previously recorded flight data.

3. The system as defined in claim 2 wherein said coinciding reference data relates to the gross weight and center of gravity location of the helicopter.

4. The system as defined in claim 3 wherein said means for determining the real time values includes: a memory device for storing the measured variable input parameters and the neural network algorithm; and means for signal processing helicopter fuel information and initial estimates of the gross weight and center of gravity location during hover conditions to obtain predictions on the gross weight and center of gravity location subsequently calculated during airflight.

5. The system as defined in claim 4 wherein the initial estimates are updated by signal processing of data generated during airflight subsequent to the hover conditions.

6. The system as defined in claim 1 wherein said means for determining the real time values includes: a memory device for storing the measured variable input parameters and an algorithm; and means for signal processing measured variable input parameters and helicopter fuel information in accordance with said algorithm to obtain the estimated information on the gross weight and center of gravity location subsequently calculated during airflight.

7. A system for estimating information on gross weight and center of gravity location onboard a helicopter by using variable input parameters measured during airflight in a reference frame fixed relative to the helicopter, including the steps of generating successive signals representing said measured variable input parameters; and determining from said signals the estimated information in terms of real time values of the gross weight and center of gravity location in accordance with a learned relationship.

8. The system as defined in claim 1 wherein said learned relationship is developed by use of at least one neural network algorithm which interrelates said input parameters with coinciding reference data obtained from previously recorded flight data.

9. The system as defined in claim 2 wherein said coinciding reference data relates to the gross weight and center of gravity location of the helicopter.

10. The system as defined in claim 3 wherein said step of determining the real time values includes the steps of: storing the measured variable input parameters and the neural network algorithm in a memory device; and signal processing helicopter fuel information and initial estimates of the gross weight and center of gravity location during hover conditions to obtain predictions on the gross weight and center of gravity location subsequently calculated during airflight.

11. The system as defined in claim 10 wherein the initial estimates are updated by signal processing of data generated during airflight subsequent to the hover conditions.

12. The system as defined in claim 7 wherein said step of determining the real time values includes the steps of: storing the measured variable input parameters and an algorithm in a memory device; and signal processing helicopter fuel information in accordance with said algorithm to obtain the estimated information on the gross weight and center of gravity location.

* * * * *